United States Patent
Fogelberg

(10) Patent No.: US 11,860,663 B2
(45) Date of Patent: Jan. 2, 2024

(54) THROTTLE CONTROL MECHANISM FOR A SURFACING MACHINE

(71) Applicant: HUSQVARNA AB, Huskvarna (SE)

(72) Inventor: Andreas Fogelberg, Söderköping (SE)

(73) Assignee: HUSQVARNA AB, Huskvarna (SE)

( * ) Notice: Subject to any disclaimer, the term of this patent is extended or adjusted under 35 U.S.C. 154(b) by 30 days.

(21) Appl. No.: 17/801,380

(22) PCT Filed: Feb. 11, 2021

(86) PCT No.: PCT/SE2021/050108
§ 371 (c)(1),
(2) Date: Aug. 22, 2022

(87) PCT Pub. No.: WO2021/177872
PCT Pub. Date: Sep. 10, 2021

(65) Prior Publication Data
US 2023/0152838 A1    May 18, 2023

(30) Foreign Application Priority Data

Mar. 5, 2020    (SE) ..................... 2050249-8

(51) Int. Cl.
*F02D 11/02*    (2006.01)
*G05G 1/04*    (2006.01)
(Continued)

(52) U.S. Cl.
CPC ............. *G05G 1/04* (2013.01); *A01D 34/68* (2013.01); *A01D 34/76* (2013.01); *F02B 63/02* (2013.01);
(Continued)

(58) Field of Classification Search
CPC .. F02D 11/02; F02D 11/04; F02D 2001/0045; G05G 1/04; G05G 5/005;
(Continued)

(56) References Cited

U.S. PATENT DOCUMENTS 3,386,353 A    6/1968    Wells
3,695,244 A    10/1972    Vauille
(Continued)

FOREIGN PATENT DOCUMENTS

CN    2627227 Y    7/2004
EP    1104824 A1    6/2001
(Continued)

OTHER PUBLICATIONS

International Search Report and Written Opinion for PCT Application No. PCT/SE2021/050108, dated Feb. 26, 2021.
(Continued)

*Primary Examiner* — Hai H Huynh
(74) *Attorney, Agent, or Firm* — Burr & Forman LLP

(57) ABSTRACT

A throttle control mechanism for a surfacing machine, the control mechanism comprising a control member (310) arranged movable (M, D) in a support structure (320), wherein the control member (310) is arranged to be tensely attached to a throttle actuator (330) of the surfacing machine via a tensile engagement member (340), wherein the control member (310) is arranged to be held fixed in the support structure in at least a first throttle position (350), where the control member is arranged biased towards an idle throttle position (370) when released from the first throttle position (350), and wherein the first throttle position (350) and the idle throttle position (370) are configurable to provide an engine speed margin with respect to a clutch engagement engine speed range of the surfacing machine.

21 Claims, 4 Drawing Sheets

(51) Int. Cl.
  *F02B 63/02* (2006.01)
  *F02D 11/04* (2006.01)
  *G05G 5/06* (2006.01)
  *A01D 34/68* (2006.01)
  *A01D 34/76* (2006.01)
  *G05G 5/00* (2006.01)
  *G05G 5/18* (2006.01)
  *F02D 1/00* (2006.01)

(52) U.S. Cl.
  CPC .............. *F02D 11/02* (2013.01); *F02D 11/04* (2013.01); *G05G 5/005* (2013.01); *G05G 5/06* (2013.01); *G05G 5/18* (2013.01); *A01D 2034/6843* (2013.01); *F02D 2001/0045* (2013.01)

(58) Field of Classification Search
  CPC . G05G 5/06; G05G 5/18; A01D 34/76; A01D 34/68; A01D 2034/6843; F02B 63/02
  USPC .............................. 123/399, 339.1, 372, 376
  See application file for complete search history.

(56) References Cited

U.S. PATENT DOCUMENTS

| | | |
|---|---|---|
| 4,336,778 A | 6/1982 | Howard |
| 4,949,591 A | 8/1990 | Roelle |
| 7,171,942 B2 | 2/2007 | Nickel |
| 7,381,009 B2 | 6/2008 | Jenkins et al. |
| 7,735,471 B2 | 6/2010 | Andersson et al. |
| 9,103,289 B2 | 8/2015 | Gwosdz et al. |
| 10,436,135 B2 | 10/2019 | Larsson et al. |
| 2013/0151126 A1 | 6/2013 | Harrer et al. |

FOREIGN PATENT DOCUMENTS

| | | |
|---|---|---|
| EP | 2811079 A1 | 12/2014 |
| EP | 2829708 A1 | 1/2015 |
| JP | S6036769 Y2 | 10/1985 |
| JP | 2000337175 A | 12/2000 |

OTHER PUBLICATIONS

Search Report and Office Action for Swedish Application No. 2050249-8 dated Sep. 18, 2020.

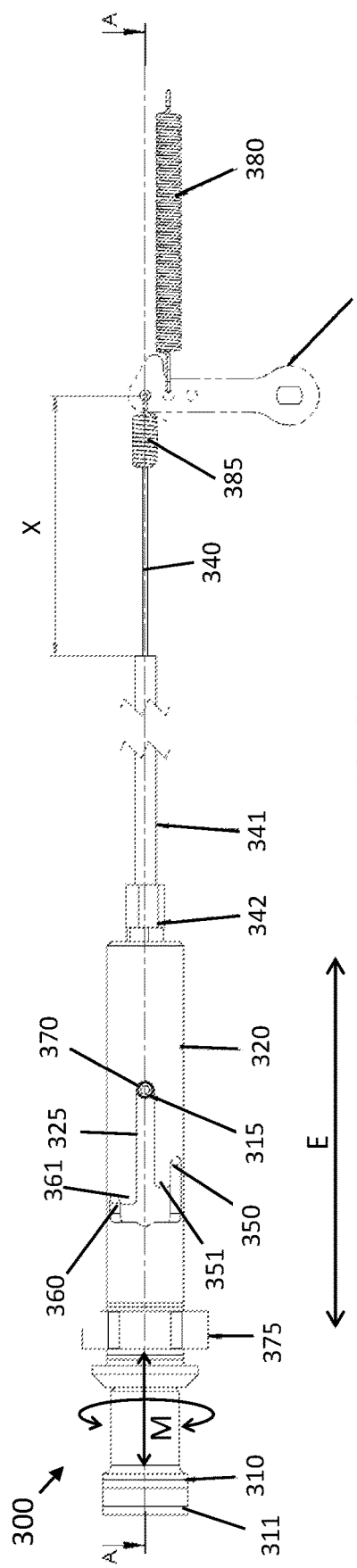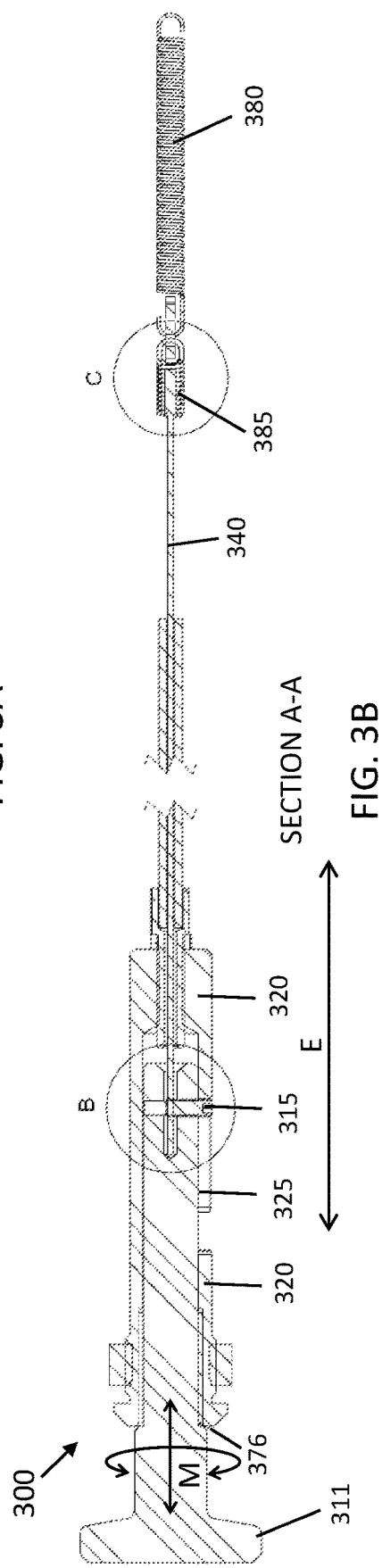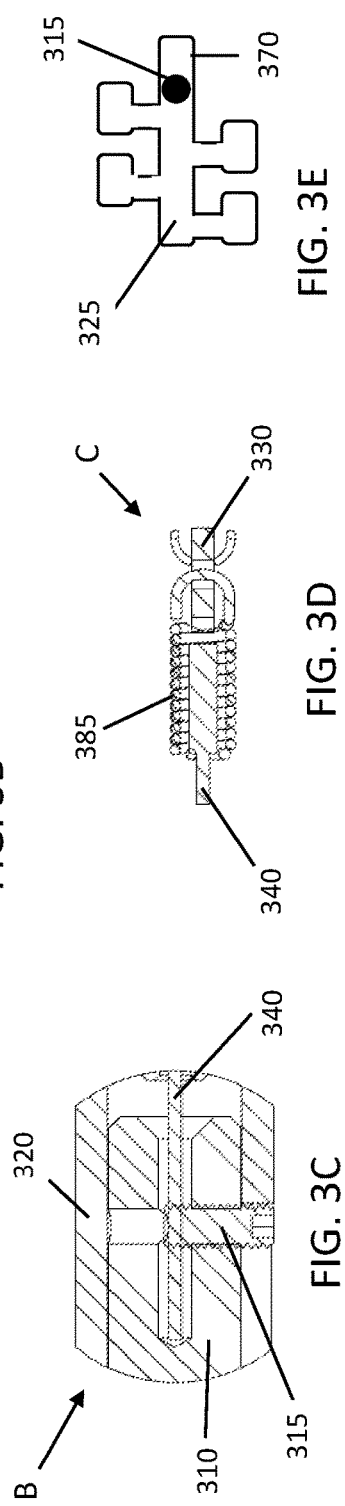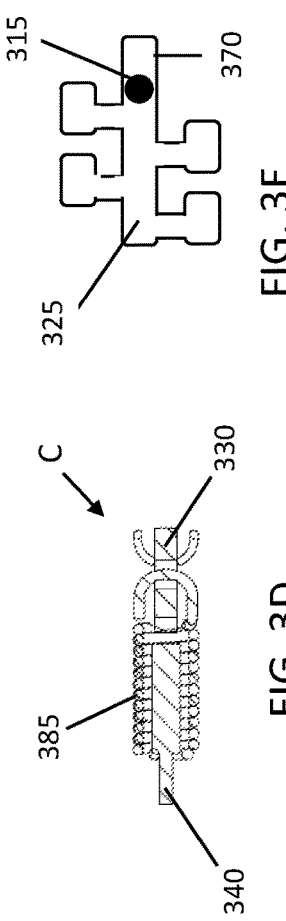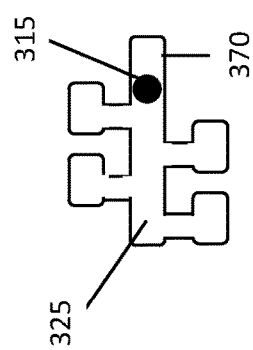

THROTTLE CONTROL MECHANISM FOR A SURFACING MACHINE

TECHNICAL FIELD

The present disclosure relates to surfacing machines, i.e., grinding and polishing machines for treating hard surfaces such as concrete and stone floors and other surfaces. There are disclosed throttle control mechanisms, i.e., arrangements for controlling an engine speed of the surfacing machine.

BACKGROUND

Floor grinding relates to the process of smoothing and polishing, e.g., concrete floors by means of a grinding machine. By grinding and polishing hard materials such as concrete and stone, it is possible to achieve a finish resembling that of a polished marble floor. A polished concrete floor is easy to clean and is also often visually appealing.

Floor grinding may also be used to level a floor surface, i.e., to remove bumps and other imperfections. This may be desired in production facilities where complicated machinery may require a levelled supporting surface.

Floor grinders may be powered by combustion engines such as gasoline engines or propane powered engines. Such engines are normally connected to the rotatable work tool via a clutch arrangement.

Known clutch arrangements comprise, e.g., friction disc clutches and centrifugal clutches.

A problem with many clutch arrangements is clutch slippage which happens when the clutch does not engage properly. This slippage generates frictional heat which may damage the clutch arrangement permanently.

There is a need for cost effective and efficient arrangements for operating a surfacing machine to prevents clutch slippage.

SUMMARY

It is an object of the present disclosure to provide improved mechanisms for throttle control of surfacing machines, this object is at least in part obtained by a throttle control mechanism for a surfacing machine. The control mechanism comprises a control member arranged movable in a support structure, wherein the control member is arranged to be tensely attached to a throttle actuator of the surfacing machine via a tensile engagement member. The control member is arranged to be held fixed in the support structure in at least a first throttle position, where the control member is arranged biased towards an idle throttle position when released from the first throttle position. The first throttle position and the idle throttle position are configurable to provide an engine speed margin with respect to an undesired engine speed range of the surfacing machine. This throttle control mechanism dissuades a machine operator from operating a machine such as a surfacing machine in an undesired engine speed range, at least for a prolonged period of time. The operator is able to select at least one distinct throttle position, which position can be adjusted depending on type of machine and operating condition. Thus, the machine life may be prolonged, and a surfacing operation can be made more efficient. The throttle control mechanisms disclosed herein are robust and durable and at the same time possible to realize at low cost.

According to aspects, the control member is arranged to be held fixed in the support structure at a second throttle position different from the first throttle position. The second throttle position is configurable to provide a further engine speed margin with respect to the undesired engine speed range. Thus, the operator may select from one out of a plurality of throttle settings. One setting may, e.g., be associated with a low engine speed suitable for some operations, while the other setting may be associated with a high engine speed suitable for some other operations.

According to aspects, the throttle control comprises a resilient biasing member and the control member is arranged biased towards the idle throttle position by the resilient biasing member. The resilient biasing member may, e.g., comprise a primary extension spring configured to pull the control member towards the idle throttle position. The resilient biasing member may also comprise a secondary extension spring configured to pull the control member towards the idle throttle position, wherein the secondary extension spring is arranged with a higher spring constant compared to the primary extension spring. This way a robust yet low cost biasing function is obtained. The biasing force can be adjusted by selecting various types of springs, providing a range of design options. The secondary extension spring improves on the locking feature of the control member, which will be explained in more detail below.

According to aspects, the tensile engagement member is at least partly made from a resilient material, thereby biasing the control member towards the idle throttle position. Using a resilient material such as rubber cord or the like in the tensile engagement member provides an effect similar to that of the secondary extension spring.

According to aspects, the tensile engagement member comprises an adjustment screw configured to adjust a tension associated with the tensile engagement member. Thus, similar to the adjustment process for a bicycle handbrake, the throttle level corresponding to the various throttle positions can be adjusted or fine-tuned to a desired level in an efficient and convenient manner.

According to aspects, the support structure comprises a sleeve, and the control member is arranged inside the sleeve to slide along the extension direction of the sleeve. This way an operator may simply operate the control member by pulling on a knob or handle of the control member. This arrangement is not prone to accidentally changing engine speed by, e.g., inadvertently operating the control member. The sleeve arrangement is also resilient to dust and debris, which may otherwise interfere with the control member action.

According to aspects, the sleeve comprises a slide bearing configured to slidably support the control member inside the sleeve. The slide bearing reduces friction inside the sleeve, and also supports the control member to provide a throttle control mechanism with high quality feel which is easy to operate.

According to aspects, the sleeve comprises a main extending in the extension direction of the sleeve, and the control member comprises a guiding pin arranged to be guided by the main groove in the elongation direction of the sleeve. The control member is rotatably supported in the sleeve to move the guiding pin transversal to the elongation direction away from the main groove and into a locking position. This type of control mechanism is intuitive to operate, mechanically durable, and also resilient to build-up of particulate matter which may otherwise interfere with the control member. There is little risk of the control member inadvertently slipping out from a throttle position.

According to aspects, the control member comprises one or more circumferentially formed grooves transversally formed with respect to an elongation direction of the control member. The support structure comprises a locking pin arranged biased to enter the one or more circumferentially formed grooves, thereby fixing the control member in at least the first throttle position. This arrangement provides an alternative to the arrangement based on grooves and guiding pin. If the circumferential grooves are designed with tapered edges, and the biasing force of the locking pin is matched to the rest of the structure, then the control member can be operated by a single hand to overcome the fixing force exerted by the locking pin, which is an advantage. The design can also be adjusted to require two-handed operation, which may be warranted in order to prevent inadvertently operating the control member.

According to aspects, the throttle control mechanism comprises a dead-man switch arrangement with a line or cord attached to the locking pin. This line or cord can, e.g., be attached to an operator. If this operator falls or is injured, then the dead-man switch is activated to bring the surfacing machine into the idle throttle position. The dead-man switch can also be attached to, e.g., a vacuum device or other peripheral unit, thus ensuring that the peripheral unit is always near the surfacing machine.

According to aspects, the resilient biasing member comprises a compression spring configured to push the control member towards the idle throttle position. The compression spring may, e.g., be comprised in the support structure, where it is protected from dust and debris.

According to aspects, the control member comprises a handle pivotably arranged in the support structure. The handle provides an alternative to the designs comprising a control member arranged slidably inside a sleeve structure.

There are also disclosed herein floor grinders and construction equipment comprising the throttle control mechanisms and thus associated with the advantages mentioned above.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where

FIGS. 3A-E illustrates an example throttle control mechanism;

DETAILED DESCRIPTION

Figure 1:
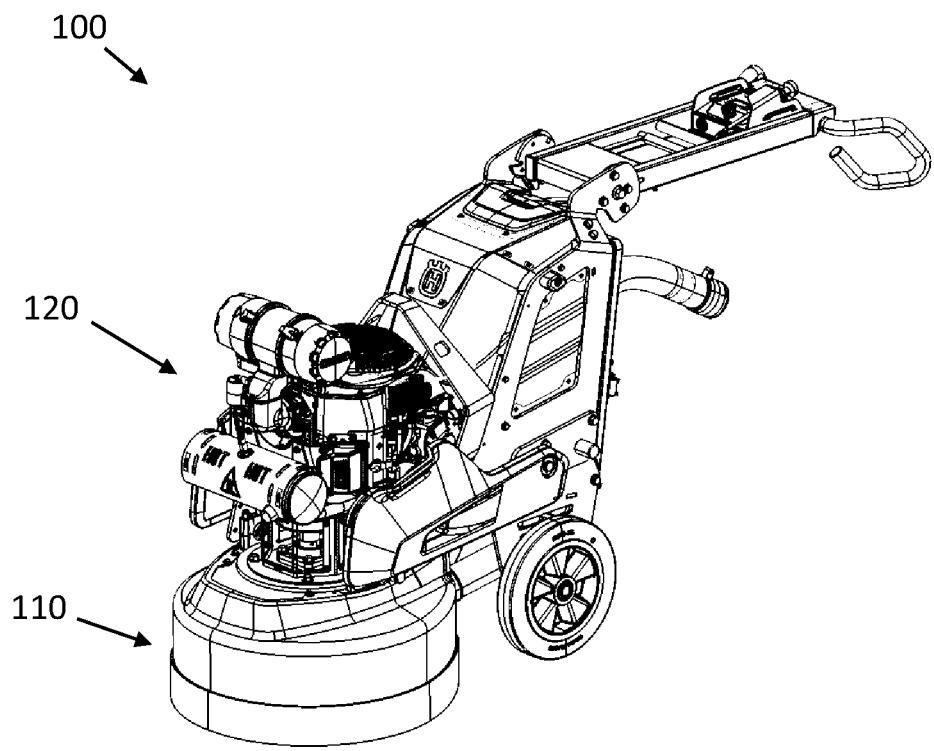
FIG. 1 shows an example surfacing machine.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates a surfacing machine 100. The grinding portion 110 of the surfacing machine 100 is powered by a combustion engine 120 such as a gasoline powered engine or a propane powered engine. The mechanism which controls the engine speed is herein referred to as a throttle mechanism. It is normally desired to be able to control the engine speed in dependence of grinding scenario and grinding tool. Some operating conditions require higher engine speeds while other conditions require lower engine speeds. Engine speed is normally measured in revolutions per minute (rpm).

Figure 2:
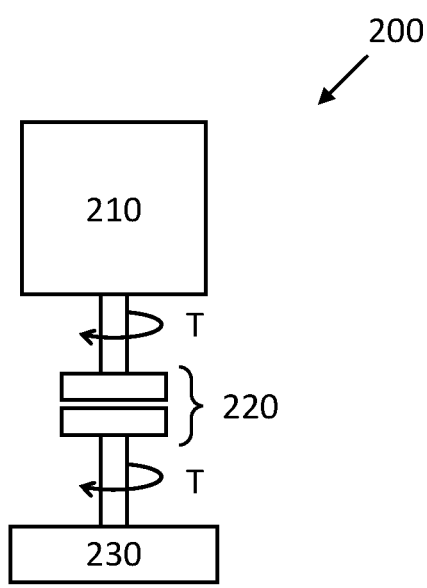
FIG. 2 schematically illustrates a clutch arrangement.

FIG. 2 schematically illustrates a transmission system for transferring torque T from the engine 210 to the grinding portion 230. A clutch mechanism 220 is arranged in-between the engine 210 and the grinding portion 230. This clutch mechanism may, e.g., be a centrifugal clutch mechanism or a friction disc clutch mechanism. Such clutch mechanisms are known and will not be discussed in more detail herein.

A problem with many clutch mechanisms is that the clutch normally has an engagement range where the clutch is only partly engaged to transfer the torque T. In this case the clutch may slip, which generates heat due to the friction in the clutch. For a centrifugal clutch, the engagement range for a surfacing machine is normally somewhere around 1800 to 2800 rpm. If the engine speed is maintained in this undesired engine speed range, then enough heat may be generated in the clutch to cause permanent damage to the clutch.

The techniques disclosed herein are not only applicable to floor surfacing machines, such as that exemplified in FIG. 1. The throttle control mechanisms disclosed herein can be applied with advantage in a wide range of different machines comprising combustion engines and clutch mechanisms. Some examples where the throttle mechanisms may be applied comprise core drilling equipment, lawn mowers, floor cleaning and sweeping equipment, compactors, floor saws, vacuum cleaners and the like.

Further, some combustion engines have scavenging systems which are optimized for particular driving conditions. The ideal driving condition is usually associated with full engine load and wide-open throttle (WOT). When operating the engine at the ideal driving condition, the scavenging system is effective, meaning that the engine delivers high power with low emissions. Engines of the type used for floor surfacing machines are often not configured for varying driving conditions. Thus, when departing from the ideal driving condition the scavenging system ceases to be effective, which can lead to unwanted effects such as misfiring, increased emission levels, and high temperatures on engine parts such as cylinder, piston, crankcase and muffler. By running the combustion engine for extended time periods far from the ideal driving condition the engine may even break down. During an idle mode driving condition, i.e., when the user-operated throttle is almost closed, the scavenging system will be far from optimal. However, the effects on the combustion engine from sub-optimal scavenging operation during low idle is often not very harmful due to the low engine speeds involved. Thus, there is normally an undesired engine speed range associated with combustion engines for surfacing machines.

According to some aspects, the undesired engine speed range may be expressed in terms of a clutch engagement speed. For instance, the idle throttle position may be associated with an engine speed below 90% of the clutch engagement speed. The first throttle position corresponding to a low speed setting may be associated with an engine speed around 110% of the clutch engagement speed. It is appreciated that these engine speed thresholds are dependent on the equipment and use case.

A problem with some surfacing machines is that the operator is able to maintain engine speed in an undesired engine speed range for prolonged periods of time, such as within the clutch engagement range or within an engine speed range where the scavenging operation of the combustion engine is not effective enough. It is desired to dissuade an operator from operating the surfacing machine in such undesired engine speed ranges.

An object of the present disclosure is to provide a throttle control mechanism which acts to dissuade operation in an undesired engine speed range. This is accomplished by means of a throttle control mechanism which has one or more distinct throttle positions which can be selected by the operator and which are configured with a margin from the undesired engine speed range. The throttle control mechanism is then biased towards an idle position such that, when the control member of the throttle is released from a throttle position, the control member of the throttle mechanism automatically reverts back to the idle throttle position, quickly passing the undesired engine speed range. Thus, a machine operator is dissuaded from prolonged operation in the undesired engine speed range, since maintaining operation in the undesired engine speed range will be uncomfortable and/or will result in an awkward work position for the operator.

FIGS. 3-7 provide some non-limiting examples of how this type of throttle control mechanism may be realized. Many aspects of the different examples can be combined, as the skilled person realizes from considering the detailed drawings. All throttle control mechanisms disclosed herein are suitable for a surfacing machine such as that shown in FIG. 1. However, the throttle control mechanisms may also be applied to other types of machinery which are associated with an undesired engine speed range.

Figure 4:
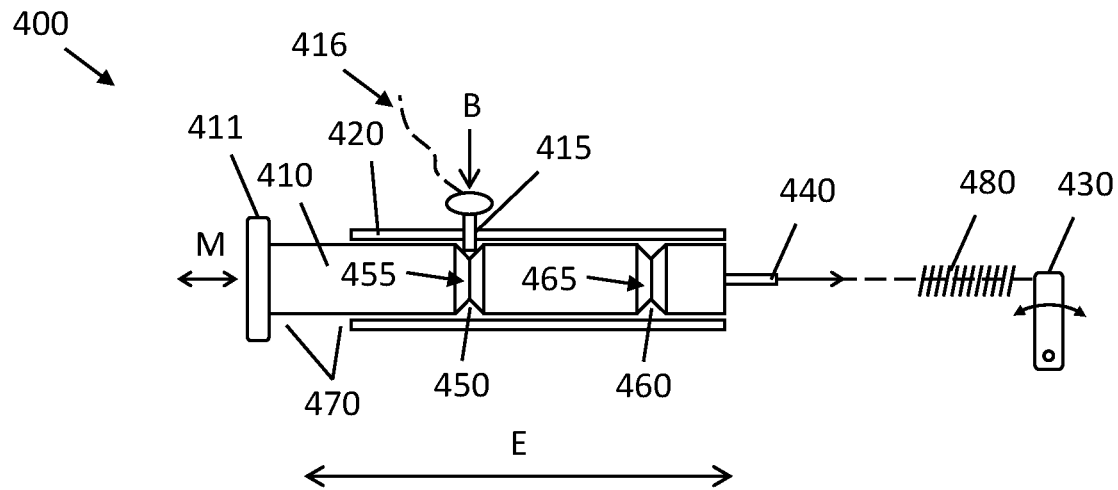
FIGS. 4-6 illustrate details of example throttle control mechanism.
Figure 5:
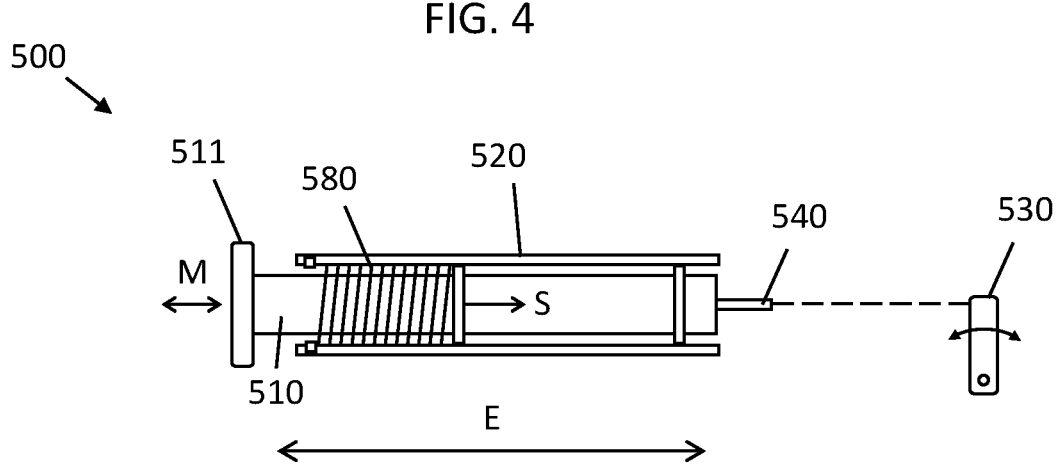
Figure 6:
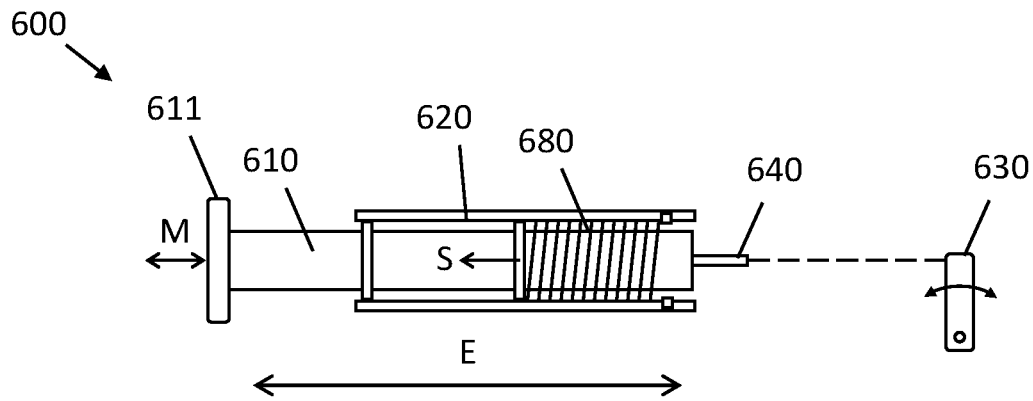
Figure 7A:
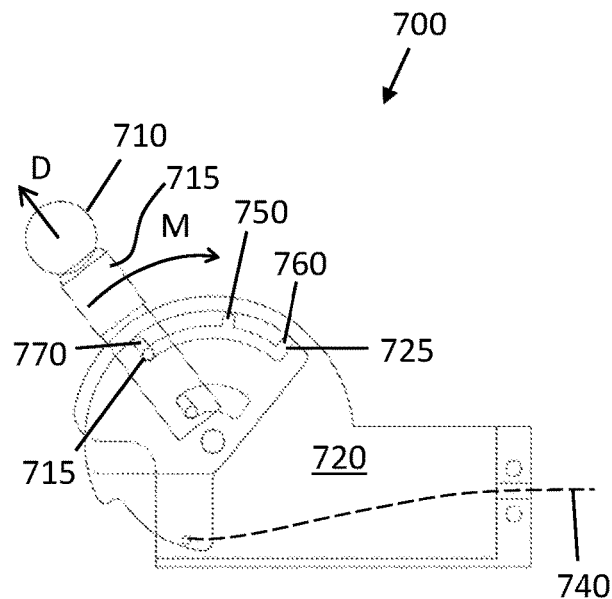
FIGS. 7A-D illustrate an example throttle control mechanism.
Figure 7B:
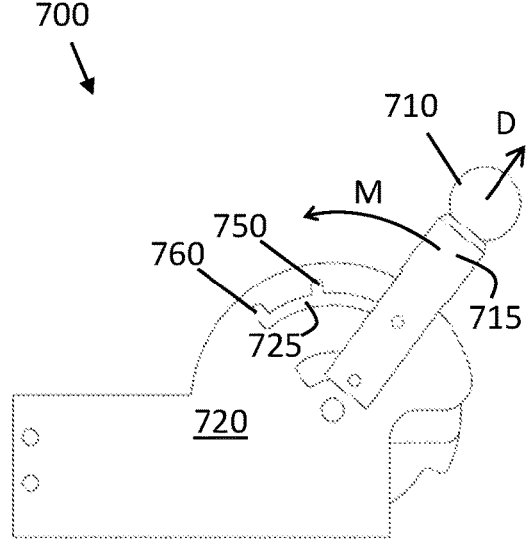
Figure 7C:
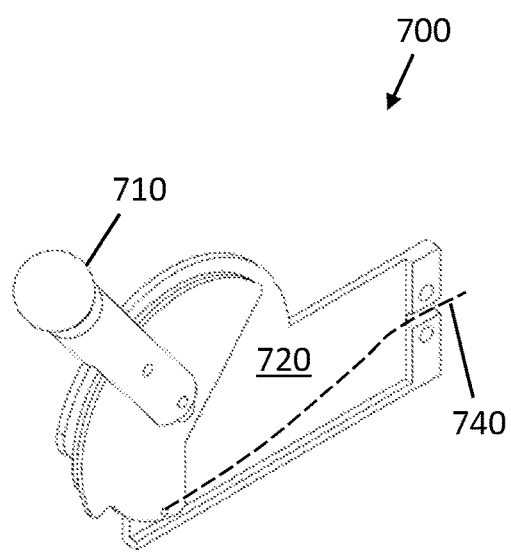
Figure 7D:
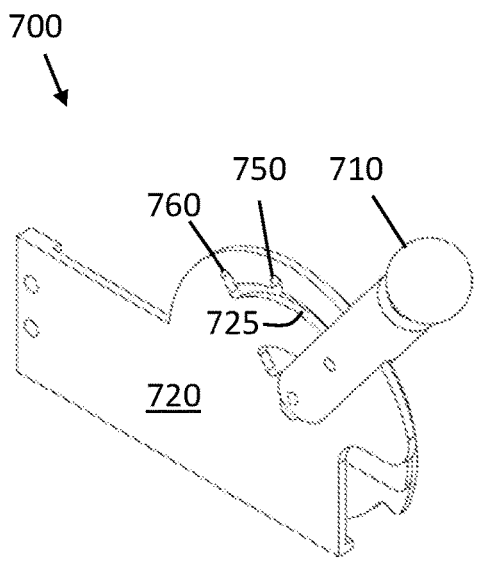

FIGS. 3-7 show examples of a throttle control mechanism 300, 400, 500, 600, 700 for a surfacing machine such as the surfacing machine 100 discussed in connection to FIG. 1. The control mechanism comprises a control member 310, 410, 510, 610, 710 arranged movable M, D in a support structure 320, 420, 520, 620, 720. The support structure can, e.g., be a sleeve 320, 420, 520, 620 as illustrated in FIGS. 3-6, where the control member 310, 410, 510, 610 is arranged inside the sleeve to slide along an extension direction E of the sleeve. The support structure can also be in the form of a lever housing structure 720 as illustrated in FIG. 7. The operator controls engine speed via the control member. For the mechanisms 300, 400, 500 in FIGS. 3-5, the operator pulls the control member 310, 410, 510 out from the sleeve in order to increase engine speed. The control member may comprise a knob 311, 411, 511, 611 for this purpose. In FIG. 6 the control member 610 is instead pushed into the sleeve to increase engine speed, while the mechanism illustrated in FIGS. 7A-D is a lever mechanism with a pivotable control member 710.

The control member 310, 410, 510, 610, 710 is generally arranged to be tensely attached to a throttle actuator 330, 430, 530, 630 of the surfacing machine 100 via a tensile engagement member 340, 440, 540, 640, 740. A tensile engagement member is an engagement member which is arranged to exert a pulling force, i.e., a tensile force, on a throttle actuator 330, 430, 530, 630 associated with the combustion engine to be controlled. Some of the tensile engagement members disclosed herein are also arranged to exert a pushing force on the throttle actuator. However, some of the implementations disclosed herein, such as the implementations 400, 500, can be used with a non-rigid engagement member, such as a cord. Other implementations, such as that in FIGS. 3A-E and that in FIGS. 6-7 use a rigid tensile engagement member such as a wire or rod.

The control member 310, 410, 510, 610, 710 is arranged to be held fixed in the support structure in at least a first throttle position 350, 450, 750. Thus, the control member can be used by the operator to set a desired throttle level of the machine.

In order to avoid operation in the undesired engine speed range discussed above, the control member is arranged biased towards an idle throttle position 370, 470, 770 when released from the first throttle position 350, 450, 750. The first throttle position 350, 450, 750 and the idle throttle position 370, 470, 770 are configurable to provide an engine speed margin with respect to an undesired engine speed range of the surfacing machine 100. This means that both the idle throttle position and the first throttle position correspond to engine speeds which are sufficiently removed from the undesired operating range. As noted above, this undesired engine speed range may be a clutch engagement engine speed range and/or an engine speed range where the scavenging operation of the combustion engine is not effective.

To operate the throttle control mechanism, an operator releases the control member from a current throttle position, and moves the control member into a desired throttle position, such as the first throttle position, whereby the control member is held fixed in the desired throttle position by the support structure. If the operator lets go of the control member before the control member has been properly received in the desired throttle position, the control member automatically reverts back to the idle throttle position.

According to some aspects, the first throttle position 350, 450, 750 is a low speed throttle position configured to provide an engine speed between 2800 rpm and 3200 rpm, and preferably around 3000 rpm.

According to some aspects, the control member 310, 410, 510, 610, 710 is arranged to be held fixed in the support structure 320, 420, 520, 620, 720 also at a second throttle position 360, 460, 760. The second throttle position 360, 460, 760 is configurable to provide a further engine speed margin with respect to the undesired engine speed range. This way the machine operator may configure the engine speed at two different settings, such as a high speed setting and a low speed setting, in addition to the idle speed setting. Both the low speed setting and the high speed setting are sufficiently removed from the undesired engine speed range. Of course, more than two distinct engine speed settings may be provided by adding more than two configurable throttle positions to the throttle control mechanism 300, 400, 500, 600, 700.

According to some aspects, the second throttle position 360, 460, 760 is a high speed throttle position configured to provide an engine speed between 3300 rpm and 3700 rpm, and preferably around 3500 rpm.

In order for the control member to strive towards the idle position, the throttle control mechanism 300, 400, 500, 600, 700 comprises a resilient biasing member 380, 480, 580, 680. The control member 310, 410, 510, 610, 710 is then arranged biased towards the idle throttle position 370, 470, 770 by the resilient biasing member.

With reference to FIGS. 3A-E, and FIG. 4, the resilient biasing member may for instance comprise a primary extension spring 380, 480 configured to pull the control member 310, 410 towards the idle throttle position 370, 470. The control member 310, 410 may be pulled out from the support structure by the operator in order to increase engine speed. By pulling the control member out the primary extension spring 380, 480 is extended and therefore generates a counter-force which strives to pull the control member back into the sleeve 320, 420. The idle position 370 of the control member is the position where the control member is fully retracted into the sleeve.

The throttle actuator 330, 430, 530, 630 of the surfacing machine 100 may optionally be biased into the idle position by a resilient member such as a torsion spring or the like. This torsion spring may constitute the resilient biasing member. Thus, by pulling the control member out the torsion spring generates a counter-force which strives to pull the control member back to the idle throttle position, e.g., into the sleeve.

The throttle control mechanism 300 shown in FIG. 3 is akin to a bayonet connector. The control member 310 is cylindrically shaped to fit inside a tubular sleeve 320. The sleeve optionally comprises a slide bearing 376 configured to slidably support the control member 310 in the sleeve. The sleeve 320 comprises a main groove 325 extending in the extension direction of the sleeve (indicated by arrow E in FIG. 3). The control member 310 comprises a guiding pin 315 arranged to be guided by the main groove 325 in the elongation direction of the sleeve. The control member 310 can be pulled out from the sleeve whereby the guiding pin 315 traverses along the main groove 325. By pulling on the control member 310, the tensile engagement member 340 acts on the throttle actuator 340 and thus the engine speed is increased from the idle speed. The primary extension spring strives to pull the control member back into the sleeve 320, i.e., back towards the idle position. If the operator lets go of the control member 310, the control member automatically reverts back to the idle position. This way prolonged operation in the undesired engine speed range is avoided, since the operator needs to hold on to the control member since otherwise it reverts back to the idle throttle position which is likely to be awkward and to result in an uncomfortable working position. The control member 310 is also rotatably supported in the sleeve, which means that the guiding pin 315 can be moved transversal to the elongation direction E away from the main groove 325 and into one out of a plurality of locking positions 350, 360 via passages extending out transversally from the main groove. FIGS. 3A and 3B show two distinct locking positions, one associated with a low speed 350 and one associated with a high speed 360. To select low speed operation, the control member is initially pulled out from the sleeve, where the guiding pin 315 travels along the main groove 325. The control member is then rotated clockwise such that the guiding pin enters the groove formed parallel to and clockwise from the main groove via the passage extending out from the main groove. To select high speed operation, the control member is instead rotated counter-clockwise such that the guiding pin enters the groove formed parallel to and counter-clockwise from the main groove via the passage extending out from the main groove. Note that the parallel grooves forming the locking positions extend past the passage between the main groove and the respective parallel groove, forming ridges 351, 361, such that the guiding pin 315 is held in position by the extension spring 380 if the control member is released when the guiding pin is received in one of the parallel grooves. In other words, the ridges 351, 361 prevent rotation of the control member once the guiding pin is in the locking position. It is appreciated that the main groove and parallel grooves can be formed in many different ways. FIG. 3E schematically illustrates another groove arrangement with four different throttle positions selectable by the operator, in addition to the idle throttle position 370.

According to some aspects, the biasing member also comprises a secondary extension spring 385 configured to pull the control member 310 towards the idle throttle position. The secondary extension spring 385 is preferably arranged with a higher spring constant compared to the primary extension spring 380.

The purpose of the secondary extension spring 385 is to allow the guiding pin to traverse over the ridge 361 into the high speed throttle position, even if the throttle actuator 330 has reached an end position.

It is appreciated that a Bowden cable or the like can be used as part of the tensile engagement member 340. However, unlike their use for switching gears and controlling brakes on bicycles and the like, a pushing action by the tensile engagement member 340 is not necessary here. Hence, according to some aspects, a more flexible line or cord can be used instead of a stiff wire. Also, the line cord itself can be used to provide a level of resilience. Thus, according to some aspects, the tensile engagement member 340, 440, 540, 640, 740 is at least partly made from a resilient material, thereby biasing the control member towards the idle throttle position 370, 470, 770.

FIG. 3B shows a cross-sectional view of the throttle control mechanism 300, taken along section A-A as indicated in FIG. 3A.

FIG. 3C illustrates details of the guiding pin 315. This example guiding pin also serves the dual purpose of fixing the tensile engagement member 340 to the control member 310.

FIG. 3D illustrates details of the secondary extension spring 385. As noted above, this secondary extension spring is configured to generate a force which overcomes that generated by the primary extension spring 380. This way, as the control member 310 is pulled all the way out of the support structure sleeve such that the throttle actuator 330 contacts the end stop, the secondary extension spring 385 still allows the guiding pin 315 to overtravel the ridge 361 to the high speed locking position.

As an alternative or complement to the guiding pin and groove arrangement illustrated in FIGS. 3A-E, with reference to FIG. 4, the cylindrically shaped control member 410 may also comprise one or more circumferentially formed grooves 455, 465 transversally formed with respect to an elongation direction E of the control member 410. The support structure 420 comprises a locking pin 415 arranged biased B to enter the one or more circumferentially formed grooves 455, 465, thereby fixing the control member 410 in at least the first throttle position 450, 460. This version of the control member 410 is also pulled out from the sleeve in order to increase engine speed via the tensile engagement member 440. However, holding the control member fixed in a throttle position is now achieved by the locking pin 415 which enters a groove, and thereby prevents the control member from sliding in the elongation direction. The control member automatically reverts back to the idle throttle position in case the locking pin 415 is released, i.e., is pulled up from the circumferentially formed groove. The biasing force of the locking pin 415 may be dimensioned such that a resolute push on the control member is enough to move the control member out of a throttle position.

According to some aspects, a dead-man switch arrangement comprising a line or cord 416 attached to the locking pin 415 is also provided. This line 416 can, e.g., be attached to an operator. If this operator falls or is injured, then the dead-man switch is activated to bring the surfacing machine into the idle throttle position. The dead-man switch can also be attached to, e.g., a vacuum device or other peripheral unit, thus ensuring that the peripheral unit is always near the surfacing machine.

The resilient biasing member may also comprise a compression spring which provides the technical effect of biasing the control member towards the idle throttle position. With reference to the examples shown in FIG. 5 and FIG. 6, the biasing member comprises a compression spring 580, 680 configured to push the control member 510, 610, 710 towards the idle throttle position.

The compression spring 580, 680, if present, is preferably comprised in the support structure 520, 620, 720. This way no springs or other resilient members need to be arranged in connection to the throttle actuator, or even external to the support structure, which is an advantage.

FIG. 5 illustrates one example where the compression spring 580 is arranged to resist pulling out the control member 510 from the support structure sleeve 520. If the control member is released it reverts back to a position retracted in the sleeve corresponding to the idle throttle position. No locking mechanism is shown in FIG. 5, but it is appreciated that any locking mechanism can be used, such as the guiding pin and groove locking mechanism from FIGS. 3A-E or the locking pin mechanism from FIG. 4.

FIG. 6 instead shows a compression spring arrangement which resists pushing the control member into the support structure 620. The position where the control member extends fully from the support structure sleeve 620 now corresponds to the idle throttle position, while a control member fully pushed into the sleeve corresponds to a position associated with high engine speed. Again, no locking mechanism is shown in FIG. 6, but it is appreciated that any locking mechanism can be used, such as the guiding pin and groove locking mechanism from FIGS. 3A-E or the locking pin mechanism from FIG. 4.

FIG. 7 illustrates aspects of the throttle control mechanism 700, wherein the control member 710 comprises a handle 715 pivotably arranged in the support structure 720 instead of a control member configured to be pulled out from a sleeve-like support structure. The handle is again biased towards a position associated with idle throttle. A torsion spring or the like may be used to bias the control member towards the idle position. Alternatively, or in combination with the torsion spring, an extension spring may be used to bias the control member 710 towards to idle throttle position in a similar manner to the biasing member arrangement shown in FIGS. 3A-E. The control member 710 is here held in position by slots extending radially outwards from an annular main groove 725, into which a pin 715 on the control member may enter via respective passages from the main groove 725. The control member is biased in the radial direction D, by, e.g., a compression spring or the like, in order for the pin to strive to enter the slots, thereby holding the control member in a desired throttle position. As soon as the control member is pushed in direction opposite to direction D, the pin 715 again enters the main groove 725 where it automatically travels to the idle throttle position 770 due to the biasing force acting on the control member 710.

The tensile engagement member 740 is attached to the control member 710 in a known manner. A Bowden cable or the like can be used as tensile engagement member 740 to connect the control member 710 to a throttle actuator arranged in connection to the combustion engine.

The invention claimed is:

1. A throttle control mechanism for a surfacing machine powered by a combustion engine and comprising a clutch mechanism,
    the control mechanism comprising a control member arranged movable in a support structure,
    wherein the control member is arranged to be tensely attached to a throttle actuator of the surfacing machine via a tensile engagement member,
    wherein the control member is arranged to be held fixed in the support structure in a first throttle position, where the control member is arranged biased towards an idle throttle position when released from the first throttle position, and
    wherein the first throttle position and the idle throttle position are configurable to provide an engine speed margin with respect to an undesired engine speed range of the surfacing machine.

2. The throttle control mechanism according to claim 1, wherein the control member is arranged to be held fixed in the support structure at a second throttle position different from the first throttle position, wherein the second throttle position is configurable to provide a further engine speed margin with respect to the undesired engine speed range.

3. The throttle control mechanism according to claim 1, comprising a resilient biasing member, wherein the control member is arranged biased towards the idle throttle position by the resilient biasing member.

4. The throttle control mechanism according to claim 3, wherein the biasing member comprises a primary extension spring configured to pull the control member towards the idle throttle position.

5. The throttle control mechanism according to claim 3, wherein the resilient biasing member comprises a secondary extension spring configured to pull the control member towards the idle throttle position, wherein the secondary extension spring is arranged with a higher spring constant compared to the primary extension spring.

6. The throttle control mechanism according to claim 3, wherein the resilient biasing member comprises a compression spring configured to push the control member towards the idle throttle position.

7. The throttle control mechanism according to claim 6, wherein the compression spring is comprised in the support structure, and wherein the control member comprises a handle pivotably arranged in the support structure.

8. The throttle control mechanism according to claim 1, wherein the tensile engagement member is at least partly made from a resilient material, thereby biasing the control member towards the idle throttle position, or
    wherein the tensile engagement member comprises an adjustment screw configured to adjust a tension associated with the tensile engagement member.

9. The throttle control mechanism according to claim 1, wherein the support structure comprises a sleeve, and wherein the control member is arranged inside the sleeve to slide along an extension direction of the sleeve.

10. The throttle control mechanism according to claim 9, wherein the sleeve comprises a slide bearing configured to slidably support the control member inside the sleeve.

11. The throttle control mechanism according to claim 9, wherein the sleeve comprises a main groove extending in the extension direction of the sleeve, and wherein the control member comprises a guiding pin arranged to be guided by the main groove in the elongation direction of the sleeve, wherein the control member is rotatably supported in the sleeve to move the guiding pin transversal to the elongation direction away from the main groove and into a locking position.

12. The throttle control mechanism according to claim 9, wherein the control member comprises one or more circumferentially formed grooves transversally formed with respect to an elongation direction of the control member, and wherein the support structure comprises a locking pin arranged biased to enter the one or more circumferentially formed grooves, thereby fixing the control member in the first throttle position.

13. The throttle control mechanism according to claim 12, comprising a dead-man switch arrangement comprising a line or cord attached to the locking pin.

14. A surfacing machine comprising the throttle control mechanism according to claim 1.

15. The surfacing machine according to claim 14, wherein the first throttle position is a low speed throttle position configured to provide an engine speed between 2800 rpm and 3200 rpm.

16. The surfacing machine according to claim 15, wherein the second throttle position is a high speed throttle position configured to provide an engine speed between 3300 rpm and 3700 rpm.

17. The surfacing machine according to claim 14, wherein the surfacing machine is a floor grinding machine, and wherein the throttle control mechanism is configured to control a revolution speed of a planetary head or one or more satellites of the floor grinding machine.

18. The surfacing machine according to claim 14, further comprising a clutch mechanism, wherein the clutch mechanism is a centrifugal clutch mechanism arranged to operate based on centrifugal force.

19. The surfacing machine according to claim 18, wherein the undesired engine speed range corresponds to a speed range from 90% of a clutch engagement speed to 110% of the clutch engagement speed.

20. The surfacing machine according to claim 14, comprising an engine, wherein the engine is a combustion engine.

21. A method for operating a throttle control mechanism to control a surfacing machine powered by a combustion engine and comprising a clutch mechanism, wherein the control mechanism comprises a control member arranged movable in a support structure, wherein the control member is arranged to be tensely attached to a throttle actuator of the surfacing machine via a tensile engagement member, wherein the control member is arranged to be held fixed in the support structure in at least a first throttle position, where the control member is arranged biased towards an idle throttle position when released from the at least first throttle position, and wherein the at least first throttle position and the idle throttle position are configurable to provide an engine speed margin with respect to an undesired engine speed range of the surfacing machine, the method comprising releasing the control member from a current throttle position, and moving the control member into a desired throttle position, whereby the control member is held fixed in the desired throttle position by the support structure.

* * * * *